United States Patent Office 2,870,170
Patented Jan. 20, 1959

2,870,170

ESTERS OF EPOXY-SUBSTITUTED POLYCARBOXYLIC ACIDS AND EPOXY-SUBSTITUTED ALCOHOLS

George B. Payne and Curtis W. Smith, Berkeley, Calif., assignors to Shell Development Company, New York, N. Y., a corporation of Delaware No Drawing. Application December 8, 1953
Serial No. 397,011

5 Claims. (Cl. 260—348)

This invention relates to a new class of epoxy-substituted organic compounds and to a method for their preparation. More particularly, the invention relates to novel esters having epoxy groups both in the acid and alcohol portions of the molecule, to a method for their preparation, and to the utilization of the esters, particularly as stabilizers and plasticizers and as monomers for the preparation of valuable polymeric materials.

Specifically, the invention provides new and particularly useful polyepoxide materials comprising esters of polycarboxylic acids possessing at least one epoxy group, i. e., a

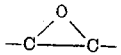

group, and monohydric or polyhydric alcohols possessing at least one epoxy group. As a special embodiment, the invention provides esters of epoxy-substituted polycarboxylic acids wherein at least one of the carboxyl groups of the polycarboxylic acid has been esterified with an alcohol containing an epoxy group and at least one of the other carboxyl groups has been esterified with an ethylenically unsaturated alcohol, such as, for example, allyl or methallyl alcohol.

The invention further provides improved polymers and resins obtained by polymerizing the above-described polyfunctional esters through the epoxy groups alone or with other epoxy-substituted materials, such as the polyepoxide polyethers obtained by reacting polyhydric phenols with epichlorohydrin, or, in the case of the above-described special type of esters possessing an ethylenically unsaturated alcohol radical, by polymerizing these esters through the ethylenic group, alone or with other materials containing an ethylenic linkage, such as methyl methacrylate, styrene, and the like, and then cross-linking the products through the remaining epoxy groups and/or ethylenic linkage.

It is an object of the invention to provide a new class of epoxy-substituted organic compounds. It is a further object to provide novel esters of epoxy-substituted polycarboxylic acids and epoxy-substituted alcohols, and a method for their preparation. It is a further object to provide novel polyepoxide esters which are particularly useful and valuable in the chemical and related industries. It is a further object to provide esters of epoxy-substituted polycarboxylic acids and epoxy-substituted alcohols that are particularly valuable as stabilizers and plasticizers for vinyl polymers. It is a further object to provide novel polyepoxide esters that are valuable as lubricants and crease- and shrink-proofing agents for textile fabrics. It is a further object to provide novel epoxy-substituted esters that are valuable in the preparation of improved polymers and resins. Other objects and advantages of the invention will be apparent from the following detailed description thereof.

It has now been discovered that these and other objects may be accomplished in part by the novel polyepoxide materials of the present invention which comprise esters of polycarboxylic acids possessing at least one epoxy group and monohydric or polyhydric alcohols possessing at least one epoxy group. It has been found that these particular esters possess unobvious beneficial properties which make them particularly adapted for many important commercial applications. These novel esters are, for example, good stabilizers for halogen-containing polymers, such as the polymers of vinyl chloride, and endow the resulting compositions with improved resistance to decomposition by heat and light. The novel esters are also valuable in the role of a plasticizer and softening agent for vinyl polymers and synthetic rubbers. When added to the halogen-containing polymers, the novel esters may act both as a plasticizing agent and as a stabilizing agent. The above-described esters also act as lubricants and softening agents for textiles and when cured within the fibers of the fabrics tend to impart improved crease and shrink resistance to the fabrics.

It has also been found that when the above-described novel esters are treated with certain catalytic materials, such as primary and secondary amines, they polymerize through the epoxy linkage to form cross-linked polymers having many valuable properties. They may be polymerized in this manner by themselves or with other polyepoxide materials. As indicated hereinafter, particularly valuable products are obtained by polymerizing the novel esters with polyepoxide polyethers obtained by reacting polyhydric phenols with epichlorohydrin.

The novel esters of the invention having at least one of the carboxyl groups esterified with an epoxy-substituted alcohol and at least one other esterfied with an ethylenically unsaturated alcohol, such as allyl alcohol, come under special consideration, particularly as to the formation of resins and polymers, as they may be polymerized through the epoxy group alone or with other epoxy-containing materials in the presence of the above-described catalysts and then subsequently cured through the ethylenic group alone or with other ethylenic monomers in the presence of free radical yielding catalysts, such as peroxides, or alternatively they may be cured first through the ethylenic group alone or with other ethylenically unsaturated compounds in the presence of the free radical yielding catalysts and subsequently cured through the epoxy groups.

The epoxy-substituted polycarboxylic acids, the esters of which are provided by the present invention, are those acids having at least one epoxy group in the acid molecule. The epoxy group or groups are preferably in an internal position and preferably at least one carbon atom removed from the carboxyl groups. The acids may possess 2, 3 or 4 or more carboxyl groups and may be of an aliphatic, aromatic or heterocyclic character and may be further substituted with substituents, such as chlorine atoms, ether radicals and the like. Examples of these epoxy-substituted polycarboxylic acids include, among others, 8,9,12,13-diepoxyeicosanedioic acid, 8-epoxyethyl-10,11-epoxyeicosanedioic acid, 4,5-epoxy-cyclohexane-1,2-dicarboxylic acid, 8,9-epoxy-12-eicoenedioic acid, 6,7,10,11-diepoxyhexadecanedioic acid, 3,4,5,6-diepoxycyclohexane-1,2-dicarboxylic acid, 3,4,7,8-diepoxydecane-1,1,10-tricarboxylic acid, epoxidized dimeric linoleic acid, 5,6-epoxytetradecylsuccinic acid, 6,7-epoxyhexadecanedioic acid, 7-epoxy-11-octadecenedioic acid, 3,4-epoxycyclohexane-1,3-dicarboxylic acid and 5,6-epoxycyclohexane 1,3-dicarboxylic acid.

Preferred expoxidized polycarboxylic acids, the esters of which are provided by the present invention, include those obtained by epoxidizing various types of monoethylenically and polyethylenically unsaturated polycarboxylic acids. These include acids such as maleic acid, aconitic acid, itaconic acid, allylmalonic acid, butenedioic acid and the like. A particularly preferred group of these include the monoethylenically unsaturated cyclic polycarboxylic acids obtained by condensing a maleic acid (or anhydride followed by hydrolysis) with a compound having a conjugated system of double bonds by a method such as disclosed in U. S. 2,264,429. Examples of these unsaturated polycarboxylic acids include 4-cyclohexene-1,2-dicarboxylic acid, endomethylene 3,6-tetrahydrophthalic acid anhydride, 3-acetoxy-4-cyclohexene-1,2-dicarboxylic acid, 3-hexyl-4-cyclohexene-1,2-dicarboxylic acid, and 4,5-dimethyl-4-cyclohexene-1,2-dicarboxylic acid.

Another preferred group are the polyethylenically unsaturated cyclic polycarboxylic acids obtained by a related method wherein a chloromaleic acid is condensed with a compound having a conjugated system of double bonds and the resulting product dehydrohalogenated according to a method as shown in U. S. 2,391,226. Examples of these acids include 1,4-cyclohexadiene-1,2-dicarboxylic acid, 6-ethyl-1,4-cyclohexadiene-1,2-dicarboxylic acid, 3-butyl-1,4-cyclohexadiene-1,2-dicarboxylic acid and 3,6-dimethyl-1,4-cyclohexadiene-1,2-dicarboxylic acid.

Other preferred acids are the 3,5-cyclohexadiene-1,2-dicarboxylic acids obtained by hydrolyzing 3-acyloxy-1,2,3,6-tetrahydrophthalic acids or anhydrides by the method shown in U. S. 2,632,011. Examples of these acids include 3-methyl-3,5-cyclohexadiene-1,2-dicarboxylic acid, 1,2-dimethyl-3,5-cyclohexadiene-1,2-dicarboxylic acid, and 6-butyl-3,5-cyclohexadiene-1,2-dicarboxylic acid.

Another preferred group of ethylenically unsaturated polycarboxylic acids comprise those obtained by reacting maleic acid (or anhydride followed by hydrolysis) with an olefinic compound, such as octadecene-1, and the like, as disclosed in U. S. 2,055,456 and U. S. 2,294,259. Examples of these acids include 3-octadecenylsuccinic acid, eicosenylsuccinic acid, 4-nonadecenylsuccinic acid, tetracosenylsuccinic acid and hexadecenylsuccinic acid.

Also preferred are the polyethylenically unsaturated acids obtained by a related method wherein the maleic acid is reacted with a halogenated olefinic compound, such as chloroctadecene, and then dehydrohalogenated. Examples of these acids include hexadecadienylsuccinic acid, octadecadienylsuccinic acid, nonadecadienylsuccinic acid and pentadecadienylsuccinic acid.

Still another preferred group of ethylenically unsaturated polycarboxylic acids are the dimerized unsaturated fatty acids, such as are obtained, for example, by heating ethylenically unsaturated monocarboxylic acids, such as linoleic acid, with a Friedel-Crafts catalyst such as boron trifluoride.

Also preferred are the polyethylenically unsaturated polycarboxylic acids obtained by treating a cyclic peroxide with a compound having a conjugated system of double bonds, such as butadiene and cyclopentadiene, in the presence of a heavy metal capable of existing in several valence forms, such as iron or cobalt. This method of preparation may be exemplified by the following equations showing the preparation of 8,12-eicosadienedioic acid from 1,1'-dihydroxydicyclohexyl peroxide (obtained from cyclohexanone and hydrogen peroxide) and butadiene in the presence of ferrous sulfate:

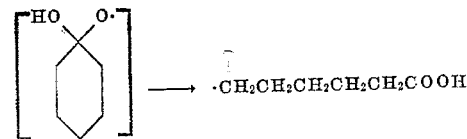

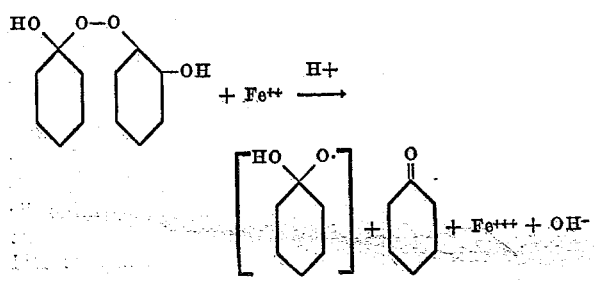

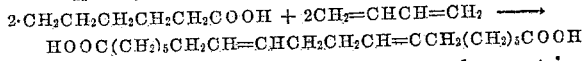

The acid produced by the above process also contains minor quantities of other acids, such as $$HOOC(CH_2)_5CH_2CH(CH=CH_2)CH_2CH=CHCH_2(CH_2)_5COOH$$

Particularly advantageous cyclic peroxides to be used in the process are those represented by the formula

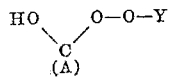

wherein Y is a hydrogen atom, a

radical, or a

radical, and A is a divalent radical containing a chain of no more than 5 carbon atoms between the two free bonds of the radical, and preferably divalent hydrocarbon radicals which may be substituted, if desired, with functional groups, such as hydroxy, nitro, cyano, carboxy, ester, ether and sulfone groups and halogen atoms.

Cyclic peroxide compounds to be used in the above process are preferably obtained by reacting hydrogen peroxide with a cyclic ketone of the formula

wherein A is a divalent radical as described above. These peroxides can be produced as described in Milas, U. S. 2,298,405, the products from equimolar amounts of cyclic ketone and hydrogen peroxide being chiefly the 1-hydroxy-1'-hydroperoxydicycloalkanyl peroxides

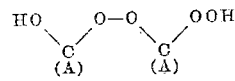

Preferred cyclic peroxides for use in the present process are the 1,1'-dihydroxydicycloalkanyl peroxides

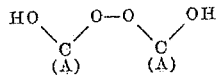

obtainable by the use of two moles of cyclic ketone per mole of hydrogen peroxide.

The A in the above-described formula of the cyclic ketone is preferably unsubstituted methylene groups or methylene groups substituted with methyl, ethyl, propyl, butyl, benzyl, phenyl, cyclohexyl, chloro, bromo, hydroxy, methoxy, keto substituents, and the like. A may also form a part of a phenyl or cyclohexyl ring. Representative examples of such suitable divalent radicals include:

—$CH_2CH_2CH_2$—

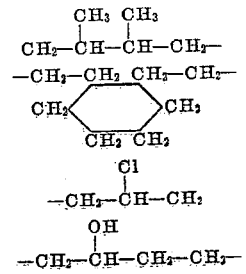

and the like.

Conjugated diethylenic compounds which can be reacted with the above-described cyclic peroxide compounds to produce the polyethylenic carboxylic acids include, among others, the conjugated diolefins, such as those of 4 to 18 carbon atoms as 1,3-butadiene, 1,3-pentadiene, isoprene, dimethyl-1,3-butadiene, 1,3,5-hexatriene, 2-ethyl-1,3-pentadiene, 2,4-octadiene,1,1-dimethyl-3-tertiary butyl-1,3-butadiene, 2-phenyl-1,3-butadiene, 1,4-diphenyl-1,3-butadiene, 2-benzyl-1,3-butadiene, 2-cyclohexyl-1,3-butadiene, 1,1-diphenyl-3,5-hexadiene, cyclopentadiene, 1,3 - cyclohexadiene, 1 - methyl - 2,4 - cyclopentadiene, 2-methyl-1,3-cyclopentadiene, the mono- and di-methyl-1,3-cyclohexadienes, 1-vinyl-1-cyclohexene, 1-tertiary butyl-1,3-cyclohexadiene, and 1,3-cycloheptadiene are typical, and substitution products of such conjugated diolefins having as substituents functional groups such as hydroxy, nitro, cyano, carboxy, ester, ether and sulfone groups or halogen atoms. As halogenated conjugated diethylenic compounds, those containing one or more atoms of fluorine chlorine and/or bromine are preferred. Representative examples of suitable halogenated conjugated diethylenic starting materials are chloroprene, 2,3-dichloro-1,3-butadiene, 1-chloro-2-methyl-1,3-butadiene, 2-chloro-1,3-pentadiene, 1-chloro-2,4-cyclopentadiene, 1-chloromethyl-2,4-cyclohexadiene, and the like. Other substituted conjugated diethylenic compounds which can be used successfully as starting materials are, for example, conjugated diethylenic alcohols such as 2,4-hexadiene-1-ol-1-3,-hexadiene-5-ol, 2,4-octadiene-6-ol and 2,4,6-octatriene-1-ol, etc., ethers such as 2-methoxy-1,3-butadiene, 2-ethoxy-1,3-butadiene, 1-ethoxy-2,3-cyclohexadiene, etc., carboxylic acids of which vinyl acrylic acid, sorbic acid (2,4-hexadienoic acid), 4-methyl-2,4-pentadienoic acid, and muconic acid are typical, and esters of such acids, such as the methyl, ethyl, isopropyl, tertiary butyl, 2-ethylhexyl, decyl, and the like. 1-cyano-1,3-butadiene, 3-nitro-1,3-butadiene, 1-methylsulfonyl-1,3-butadiene, 3-vinyl-3-sulfolene, and the like, are examples of other suitable conjugated diethylenic compound which may be used in the above-described process.

Preferred compounds having the conjugated system of double bonds to be used in the process are those of the formulae

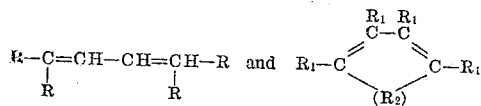 and 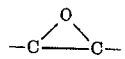

R and $R_1$ are members of the group consisting of hydrogen or hydrocarbon radicals, and preferably aliphatic hydrocarbon radicals containing from 1 to 8 carbon atoms and $R_2$ is a divalent alkylene group containing from 1 to 3 carbon atoms or a substituent derivative thereof which has one or more of the hydrogen atoms replaced by hydrocarbon radicals.

The proportions in which the cyclic peroxide and the compounds possessing the conjugated system of double bonds are employed in the reaction may vary over a considerable range. In most cases, the peroxide and the compound possessing the conjugated system of double bonds will be employed in approximately equal molecular amounts, but larger or smaller amounts may be used as desired. Preferably, one mole of the peroxide will be reacted with from 1 to 2 moles of the compound possessing the conjugated system of double bonds.

The heavy metals, such as iron and cobalt, are employed in the reaction in at least equivalent amounts. The expression "equivalent amount" in this regard refers to that amount required for the formation of free radicals from one molecule of peroxide. The heavy metals are preferably employed in amounts varying from 1 to 1.5 equivalents.

In place of the equivalent or excess amounts of the heavy metals, however, one can use smaller amounts of the metals together with a reducing agent which serves to convert the metal ions back to the lower valence form, e. g., ferric ions to ferrous ions, as fast as they are formed. Examples of such reducing agents include 1-ascorbic acid, sodium formaldehyde sulfoxylate, sodium bisulfite, reducing sugars, and the like.

The reaction between the peroxide and the compound possessing the conjugated system of double bonds may be effected in water, solvents or emulsions. The reaction is preferably carried out in the presence of common solvents, such as methanol, ethanol, tertiary butanol, benzene, diethyl ether, methyl acetate, acetone, dioxane, and the like, or mixtures thereof or mixtures of these solvents with water.

Temperatures employed in the reaction between the peroxide and the compound possessing the conjugated system of double bonds may vary over a considerable range, but is generally maintained between about —40° C. to 80° C. Pressures may be atmospheric, superatmospheric or subatmospheric.

Of special value are the mono- and polyethylenically unsaturated aliphatic and cycloaliphatic dicarboxylic acids containing no more than 26 carbon atoms, and more preferably no more than 22 carbon atoms.

Coming under special consideration, particularly because of the improved properties of the polymers obtained therefrom, are the diethylenically unsaturated dicarboxylic acids, such as those obtained by condensing a chloromaleic acid with a compound having a conjugated system of double bonds and then dehydrohalogenating the resulting product, those obtained by reacting a halogenated olefinic compound with maleic acid and dehydrohalogenating the resulting product, those obtained by dimerizing unsaturated fatty acids, and those obtained by reacting a cyclic peroxide with a compound having a conjugated system of double bonds.

The epoxy-substituted alcohols, the novel esters of which are provided by the present invention, comprise those monohydric or polyhydric alcohols possessing at least one epoxy group, i. e. a $$-C\overset{O}{\underset{}{\diagup\diagdown}}C-$$

group. These alcohols may be aliphatic, cycloaliphatic, aromatic or heterocyclic and may be saturated or unsaturated and substituted with other non-interfering substituents, such as halogen atoms, ether radicals, and the like. Examples of these alcohols include 2,3-epoxypropanol, 3,4-epoxybutanol, 2,3-epoxyhexanol, 5,6-epoxyoctanol, epoxidized octadecadienol, epoxidized dodecadienol, epoxidized tetradecadienol, 3,4-epoxydihydropyran-5-propenol, 2,3-epoxypentanediol-1,5, 2,3-dimethyl-4,5-epoxyoctanol, 2-methoxy-4,5-epoxyoctanol, 3,4-epoxy-5-chlorocyclohexanol, 2,3-epoxypropoxypropanol, 2,3-epoxypropoxyhexanol, 2,3 - epoxypropoxy - 2,4 - dihydroxyheptanol, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 15 carbon atoms, and the aliphatic and cycloaliphatic dihydric alcohols containing from 4 to 15 carbon atoms, such as 2,3-epoxybutanediol-1,4,2,3 - epoxyhexanediol - 1,5,3,4 - epoxyoctanediol - 1,5, 2,3,4,5-diepoxycyclohexanediol-1,6, 3,4-epoxydodecanol, 2-methyl-2,3-epoxypropanol, 2,3-cyclohexanol, 2,3-epoxypropoxyethanol, 2,3-epoxypropoxyoctanol, and the like.

Particularly preferred epoxy-substituted alcohols are the epoxyalkanols, epoxyalkoxyalkanols, epoxyalkenols, epoxyalkoxyalkenols, epoxycycloalkanols and epoxyalkoxyalkanols, epoxycycloalkenols and epoxyalkoxyalkenols, and particularly those containing not more than 12 carbon atoms, such as 2,3-epoxypropanol, 3,4-epoxyhexanol, 2,3-epoxypropoxyoctanol, 2,3-epoxy-5-octenol, 2,3-epoxy-6-dodecenol, 2,3-epoxypropoxy-5-octenol, 3,4- epoxycyclohexanol, 2,3 - epoxypropoxy - 4 - cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their esters as well as the superior properties possessed by such esters.

The novel esters of the invention are those theoretically desired by esterifying any one of the above-described acids with any one or more of the above-described alcohols. Carboxyl groups of the epoxy-substituted polycarboxylic acids not esterified with the above-described epoxy-substituted alcohols may remain as free carboxyl groups or may be esterified with other types of alcohols, such as saturated or unsaturated aliphatic or cycloaliphatic alcohols or phenols, such as methanol, ethanol, butanol, hexanol, octanol, octadecanol, allyl alcohol, methallyl alcohol, ethallyl alcohol, chloroallyl alcohol, crotyl alcohol, cyclohexenol, benzyl alcohol, phenol, bisphenol, and the like. As indicated above, the other carboxyl groups are preferably esterified with ethylenically unsaturated monohydric alcohols, and particularly the allyl-type monohydric alcohols, i. e. the beta,gamma-monoethylenically unsaturated monohydric alcohols, such as allyl alcohol, methallyl alcohol, crotyl alcohol, 2-chloro-3-butenol, 2-octenol, and the like.

Examples of the novel esters of the invention include, among others, tri(2,3 - epoxypropyl) epoxyaconitate, di(2,3 - epoxypropyl) 4,5 - epoxycyclohexane - 1,2 - dicarboxylate, tri(2,3 - epoxypropyl) epoxyitaconate, di (2 - methyl - 2,3 - epoxypropyl) 3 - chloro - 4,5 - epoxycyclohexane - 1,2 - dicarboxylate, di(3,4 - epoxybutyl) 3,6 - dimethyl - 4,5 - epoxycyclohexane - 1,2 - dicarboxylate, di(2,3 - epoxypropyl) 2,3 - epoxyoctadecylsuccinate, di(5,6 - epoxyhexyl) 3,4,5,6 - diepoxycyclohexane-1,2-dicarboxylate, di(3,4 - epoxyhexyl) 2,3 - epoxyhexadecylsuccinate, di(epoxypropoxy ethyl) 2,3-epoxyhexadecylsuccinate, 2,3(epoxypropyl) 1,2,3,4 - diepoxycyclohexane-1,2-dicarboxylate, 2,3-epoxypropyl allyl 4,5-epoxycyclohexane - 1,2 - dicarboxylate, 2 - ethyl - 2,3-epoxypropyl methallyl 3-chloro-4,5-epoxycyclohexane, 1,2 - dicarboxylate, 4,5 - epoxyoctyl allyl 3,5 - dimethyl - 1,2,3,4 - diepoxycyclohexane - 1,2 - dicarboxylate, di(4,5 - epoxyoctyl) 1,2 - dimethyl - 3,4,5,6 - diepoxycycloehexane - 1,2 - dicarboxylate, di(3,4 - epoxyhexyl) 8,9,12,13 - diepoxyeicosanedioate, di(2,3 - epoxypropyl) 8 - epoxyethyl - 10,11 - eicosanedioate, di(3,4 - epoxypentyl) 7,8,11,12 - diepoxyoctadecanedioate, di(3,4 - epoxypentyl) 1,2,4,5 - diepoxycyclohexanedicarboxylate, di(2,3 - epoxypropyl) 1,1 - dihexyl - 8,9,11,13 - diepoxyeicosanedioate, di(2,3 - epoxypropyl) bis(2,3 - epoxypropyl) malonate, di(3,4 - epoxyhexyl) 1,2 - epoxy-4 - cyclohexene - 1,2 - dicarboxylate, di(epoxypropoxypropyl) 4,5 epoxycyclohexane - 1,2 - dicarboxylate, the di(2,3-epoxypropyl) ester of epoxidized dimerized linoleic acid.

Examples of the preferred esters, i. e. those desired from the above-described mono- and polyethylenically unsaturated aliphatic and cycloaliphatic dicarboxylic acids and the epoxy-substituted aliphatic and cycloaliphatic monohydric alcohols include, among others: di(4,5-epoxycyclohexyl) 4 - epoxycyclohexane - 1,2 - dicarboxylate, di(2,3 - epoxypropoxypropyl) 8,9,12,13 - diepoxyeicosanedioate, di(3,4 - epoxyhexyl) 4 - epoxycyclohexane - 1,2 - dicarboxylate, di(3,4 - epoxyoctyl) 3,4,5,6 - diepoxycyclohexane - 1,2 - dicarboxylate, di(3,4-epoxydecyl) 8 - epoxyethyl - 10,11 - eicosanedioate, di-(2,3-epoxyhexyl) epoxyoctadecenedioate.

The esters possessing both an epoxy group and an ethylenic group in the ester radicals may be exemplified by the following: 2,3-epoxyproyl allyl 4-epoxycyclohexane - 1,2 - dicarboxylate 3,4 - epoxyhexyl methallyl 8,9,10,13 - diepoxyeicosanedioate, 3,4 - epoxycyclohexyl chloroallyl 8 - epoxyethyl - 10,11 - eicosanedioate, 2,3-epoxypropyl 3 - hexenyl 4,5 - epoxycyclohexane - 1,2 - dicarboxylate.

The novel esters of the invention may be prepared by a variety of different methods. The may be prepared, for example, by reacting the epoxy-substituted alcohol with an acid halide of the desired epoxy-substituted polycarboxylic acid, by reacting the desired epoxy-substituted alcohol with an acid halide of an unsaturated acid corresponding to the desired polycarboxylic acid and then epoxidizing the resulting ester or by reacting the unsaturated alcohol with an acid halide of the epoxy-substituted polycarboxylic acid and epoxidizing the resulting ester, or by reacting the unsaturated alcohol with an unsaturated polycarboxylic acid or acid halide and epoxidizing the resulting ester.

The reaction between the epoxy substituted alcohol and acid halide or unsaturated substituted alcohol and epoxy-substituted acid halide is preferably accomplished in the presence of an inert solvent, such as toluene or benzene, in the presence of a hydrogen halide absorbing material at a relatively low temperature. The reactants conveniently may be employed in substantially stoichiometrically required amounts, although in the event one reactant is more precious than the other, a moderate excess of the less precious may be employed to insure high conversion of the other reactant to desired product. The reaction is preferably carried out at temperatures within the range of 0° C. to 30° C. In the event excessive heat is liberated in the reaction mixture, the reaction mixture may be cooled or the reaction may be maintained under control by dilution of the mixture with an inert solvent. The reaction may also be regulated by the controlled addition of one reactant. The material used to absorb the hydrogen halide should be one that would not react with the acid halide or epoxy group or cause polymerization of the epoxide. Preferred materials are the rather weak inorganic bases and tertiary amines, such as triethylamine, triamylamine, pyridine, and the like. Upon completion of the reaction, any salt formed by the reaction of the added hydrogen halide absorbing material and the liberated hydrogen halide may be removed from the reaction mixture by filtration or equivalent means and the filtrate suitably treated to recover the desired ester. In most cases, fractional distillation is the most convenient method for recovering the desired product although it will be appreciated that other applicable methods, such as extraction, precipitation, and the like may be used.

The epoxidation of the above-described unsaturated polycarboxylic acids and alcohols or the esters thereof may be accomplished by reacting the unsaturated product with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of products desired. In general, one should employ at least one mole of the oxidizing agent, such as perbenzoic acid, for every ethylenic group to be epoxidized. Thus, to produce di(2,3-epoxypropyl) 2,3-epoxycyclohexanedicarboxylate from diallyl 2,3-epoxycyclohexanedicarboxylate, one should react the ester with at least two moles of perbenzoic acid. In some cases, it is rather difficult to effect epoxidation of all of the ethylenic groups and if a completely epoxidized product is required, additional epoxidizing agent and/or long reaction periods may be required.

It is preferred to carry out the epoxidation reaction in a suitable mutual solvent for the reactants and product. Chloroform is an especially useful solvent for the purpose, but other materials, such as ethyl ether, dichloromethane, benzene, ethyl acetate, etc., and the like, may be used. It is not necessary to operate under anhydrous conditions, but the amount of water present should be limited so as to avoid excessive hydrolysis of the epoxy groups. Up to 25% water in the reaction mixture may be tolerated.

The temperature employed during the epoxidation may vary over a considerable range depending upon the type of reactants and oxidizing agents selected. It is generally desirable to maintain the temperature between —20° C. and 60° C., and more preferably, between 10° C. and 40° C. Atmospheric, superatmospheric, or subatmospheric pressures may be employed as desired.

The epoxidized products obtained by this method may be recovered from the reaction mixture by any convenient means known to the art, such as distillation, extraction, fractional precipitation and the like.

If one uses the esters of the unsaturated alcohols and unsaturated acids in the above-described epoxidation reaction, such esters may be obtained by any conventional esterification process, such as by reacting the alcohol with the acid in the presence of a catalyst, such as p-toluenesulfonic acid, and removing the water of esterification.

The novel esters of the invention are relatively high-boiling liquids to semi-solids. They are soluble in a great many oils and solvents and are compatible with many synthetic polymers and resins. The esters are particularly valuable as additives for vinyl polymers as they act to plasticize the polymer and form compositions having good flexibility and strength over a wide range of temperature.

The vinyl polymers that may be plasticized with the novel esters of the invention include the homopolymers, copolymers and interpolymers of the vinyl-type monomer, i. e. those monomers having a $CH_2=C=$ group, such as styrene, alpha-methyl styrene, vinyl naphthalene, vinyl phenol, acrylic acid esters as methyl acrylate, propylacrylate, butyl acrylate, esters or substituted acrylic acids, such as methyl methacrylate, lauryl methacrylate, hexyl methacrylate, vinylidene chloride, vinyl chloride, acrylonitrile, methacrylonitrile, vinyl esters of vinyl acetate, vinyl benzoate, vinyl caproate, diallyl phthalate, diallyl succinate, vinyl ethers, such as vinyl ethyl ether, vinyl butyl ether, the vinyl ketones, vinyl pyridine, and the like.

Particularly preferred materials to be plasticized with the novel esters are the halogen-containing polymers and copolymers, and particularly the homopolymer of the vinyl halides and copolymers of the vinyl halides with dissimilar monomers as the unsaturated esters.

A single novel ester may be used as the plasticizer or a mixture of two or more of the compounds may be utilized. In addition, the esters may be used as plasticizers in combination with other plasticizing materials, such as dioctyl phthalate, dibutyl phthalate, tricresyl phosphate, dibutyl sebacate, and the like.

The amount of the esters to be incorporated with the above-described polymers may vary over a considerable range depending upon the particular type of polymer, intended use of the product, etc. In most cases the amount of the plasticizer will vary from about 20 to 150 parts by weight per 100 parts by weight of resin. A more preferred range of plasticizer comprises 40 parts to 75 parts by weight for every 100 parts by weight of resins.

The polymer and ester may be compounded by means of conventional equipment such as mills of the heated roll type of internal mixers. The plasticizer and other compounding ingredients, such as fillers and stabilizers, are worked into the vinyl resin so that they are thoroughly dispersed therein by means of such equipment, and the resultant composition then molded, calendered, extruded or otherwise formed into articles of the desired shape by conventional procedure.

The novel esters of the invention may also be used as stabilizing agents for halogen-containing polymers. The esters are easily compatible with these polymers and in combination therewith form compositions which have good resistance to discoloration by heat and/or light. The novel esters may be used as stabilizers by themselves or they may be used in combination with other stabilizing agents, such as urea and thiourea derivatives, metal salts or organic and inorganic acids, and the like.

In most cases, the esters are effective as stabilizers in amounts varying from about .1% to about 5% by weight of the polymer being stabilized, but larger or smaller amounts may be employed as desired or necessary. If other stabilizers are employed in combination with the novel esters, the esters may generally be utilized in smaller quantities, such as from about .01% to about 2% by weight of the polymer.

The esters may be incorporated into the halogen-containing polymers by any suitable method. They may be added in a dissolved, suspended or pulverulent state to the desired polymer which in turn may be in a dissolved, dispersed or solid stage. In some cases, it may be possible to introduce the novel esters in the reaction mixture during the formation of the halogen-containing polymer. In most cases, however, it will probably be more desirable to add the ester by merely mixing the polymer and ester in a masticator or on heated differential rolls.

As noted above, the novel esters also act as plasticizing materials for these halogen-containing polymers so with these polymers it is possible to utilize the esters as combined stabilizer-plasticizers. In this case, the esters will be added in amounts and in the manner described hereinabove for the use of the esters as plasticizers and in that case the resulting composition will display the desired improvement in flexibility as well as increased resistance to heat and light.

The polyepoxides of the present invention are particularly useful in the preparation of valuable polymeric products. For this purpose they may be polymerized by themselves or with other types of epoxy-containing materials. Materials that may be copolymerized with the claimed polyepoxides include, among others, ethylene oxide, propylene oxide, isobutylene epoxide, epichlorohydrin, vinyl cyclohexane dioxide, butadiene mono- or dioxide, epoxidized tri- and diglycerides, epoxy-ethers, such as diglycidyl ether and glycidyl ethers of polyhydric phenols obtained by reacting a polyhydric phenol, such as bis-phenol, with an excess of a halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydrin, with a polyhydric alcohol, such as glycerol, ethylene glycol, hexanetriol, sorbitol, mannitol, pentaerythritol, polyglycerol, and the like, and subsequently treating the resulting product with an alkaline component to replace the epoxy group, and other polyepoxide esters, such as di(2,3-epoxypropyl) phthalate, di(2,3-epoxypropyl) adipate, and the like. The glycidyl polyethers of polyhydric phenols obtained by condensing polyhydric phenols with epichlorohydrin are also referred to as "ethoxyline" resins. See Chemical Week, vol. 69, page 27, for September 8, 1951.

The polymerization of the novel epoxy-substituted esters is preferably accomplished by heating the materials in the presence of a catalyst, such as an amine as triethylamine, ethylenediamine, 2,4,6-(trimethylaminomethyl) phenol, malamine, and the like, or in the presence of boron-trifluoride catalysts. Temperatures used for the polymerization generally vary from about 40° C. to about 100° C.

The special group of the esters of the invention which also possess an unsaturated linkage, such as 2,3-epoxypropyl allyl epoxycyclohexane-1,2-dicarboxylate, may also be polymerized through the unsaturated linkage and/or through the epoxy groups. Materials that may be copolymerized with the esters through the unsaturated linkage are preferably the vinyl monomers containing a $CH_2=C=$ group, such as, for example, vinyl chloride, acrylonitrile, methyl methacrylate, vinyl acetate, vinyl pyridine, allyl acetate, styrene, alpha-methyl styrene, and the like. Polymerization through the double bond may be accomplished by heating the materials in the presence of a free radical yielding catalyst, such as a peroxide as benzoyl peroxide, tertiary butyl peroxide and the like, in an amount varying from about .5% to 5% by weight of the material being polymerized.

The polymers prepared from the novel esters are of value in the preparation of pottings, castings and rigid plastic articles and in the preparation of various coating and impregnating compositions.

To illustrate the manner in which the invention may be carried out, the following examples are given. It is to be understood, however, that the examples are for the purpose of illustration and the invention is not to be regarded as limited to any of the specific materials or conditions recited therein.

*Example I*

About 251 parts of diallyl 4-cyclohexene-1,2 dicarboxylate (prepared by condensing butadiene with diallyl maleate) was added to 1000 parts of chloroform. 711 parts of a 27% peracetic acid solution was then added to the mixture and the resulting mixture allowed to stand at 0° C. to 10° C. for two days. The product was then washed with ice water, cold 20% sodium hydroxide, ice water and then filtered through sodium sulfate. Chloroform was then taken off and the product concentrated to heavy colorless oil in about 50% yield. Analysis of the oil indicated that the double bond in the acid molecule and at least one of the allyl groups had been converted to epoxy groups. Epoxy value 0.600 Br. No. 68. C=60.4, H=6.6; theory for diepoxide C=59.6, H=6.4.

The above epoxidized ester finds use as a combined plasticizer-stabilizer for poly(vinyl chloride) and copolymers of vinyl chloride and vinyl acetate. When the ester is heated with 2,4,6-tri(dimethylaminomethyl) phenol, a solid resin is formed.

Esters having related properties are obtained by replacing the diallyl 4-cyclohexene-1,2-dicarboxylate with equivalent amounts of each of the following esters: dimethallyl 4-cyclohexene-1,2-dicarboxylate, di(4-hexenyl) 4,5-dimethyl-4-cyclohexene-1,2-dicarboxylate.

*Example II*

About 303 parts of diallyl 8,12-eicosadienedioate (prepared by reacting 8,12-dicosadienedioic acid with allyl alcohol) is added to 1000 parts of chloroform. 948 parts of a 27% peracetic acid solution is then added to the mixture and the resulting mixture allowed to stand at 0° C. to 10° C. for a few days. The product is then washed with ice water, cold 20% sodium hydroxide, ice water and then filtered through sodium sulfate. Chloroform was then taken off and the product concentrated to a heavy oil. Analysis of the ester indicated that the ethylenic groups in the acid portion of the molecule and one of the allyl groups had been converted to epoxy groups.

About 25 parts of the above-described epoxidized ester is heated with 75 parts of a polyglycidyl polyether of bis-phenol having a molecular weight of about 400 and obtained by condensing epichlorohydrin with bis-phenol, in the presence of 2,4,6-tri(dimethylaminomethyl) phenol to form a hard solid resin.

*Example III*

About 400 parts of di(allyloxyethyl) 4-cyclohexene-1,2-dicarboxylate (prepared by condensing butadiene with di(allyloxyethyl) maleate) is added to 1000 parts of chloroform. 475 parts of a 27% peracetic acid solution is then added to the mixture and the resulting mixture allowed to stand at 0° C. to 10° C. for about two days. The product is then washed with ice water, cold 20% sodium hydroxide, ice water and then filtered through sodium sulfate. Chloroform is then taken off and the product concentrated to heavy colorless oil. Analysis of the oil indicated that the double bond in the acid molecule and one of the allyl groups had been converted to epoxy groups.

The above ester may be used as a combined plasticizer-stabilizer for poly(vinyl chloride). When about 25 parts of the above-described epoxidized unsaturated ester is heated with 75 parts of methyl methacrylate in the presence of benzoyl peroxide at a temperature of about 65° C., a hard solid resin is formed.

Related esters are obtained by replacing the di(allyloxyethyl) 4-cyclohexene-1,2-dicarboxylate in the above-described process with equivalent amounts of each of the following: di(allyloxypropyl) 5-butyl-4-cyclohexene-1,2-dicarboxylate, di(methallyloxypropyl) 4-cyclohexene-1,2-dicarboxylate and di(allyloxypropyl) 1,2,5,6-tetrachloro-4-cyclohexene-1,2-dicarboxylate.

*Example IV*

One mole of diallyl ester of dimerized linoleic acid is added to 1000 parts of chloroform. 948 parts of a 27% peracetic acid solution is then added to the mixture and the resulting mixture allowed to stand at 0° C. to 10° C. for several days. The product is then washed as shown in the preceding example and the chloroform taken off. Analysis of the resulting ester indicates that the ethylenic groups in the acid portion of the molecule and at least one of the allyl groups have been converted to epoxy groups.

When the above ester is heated with 2,4,6-tri(dimethylaminomethyl)phenol, it forms a solid resin.

We claim as our invention:

1. Epoxidized diallyl eicosadienedioate wherein the ethylenic groups in the acid molecule and at least one of the allyl groups have been converted to epoxy groups.
2. Di(2,3-epoxypropyl) diepoxyeicosanedioate.
3. The 2,3-epoxypropyl allyl mixed ester of epoxidized dimerized linoleic acid.
4. Di(2,3-epoxyalkyl) diepoxyeicosanedioate wherein the 2,3-epoxyalkyl groups contain from 3 to 10 carbon atoms each.
5. An ester of an open chain aliphatic ethylenically unsaturated

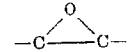

group containing polycarboxylic acid having at least 18 carbon atoms, said acid having from 2 to 3 carboxyl groups and at least one

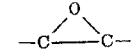

group separated from said carboxyl groups by at least one carbon atom, with a

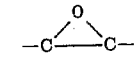

group containing alkanol of at least 3 carbon atoms.

References Cited in the file of this patent

UNITED STATES PATENTS

| | | |
|---|---|---|
| 2,476,922 | Shokal et al. | July 19, 1949 |
| 2,524,432 | Dorough | Oct. 3, 1950 |
| 2,680,109 | Stevens | June 1, 1954 |
| 2,716,123 | Frostick et al. | Aug. 23, 1955 |

OTHER REFERENCES

Swern: Chem. Reviews, vol. 45 (1949), pages 16–25.
Gill et al.: J. Chem. Soc. (1952), pages 4630–4632.